United States Patent [19]

Matsumoto et al.

[11] 4,165,930
[45] Aug. 28, 1979

[54] CAMERA HAVING A HOLOGRAPHIC INDICATOR

[75] Inventors: Kazuya Matsumoto, Yokohama; Susumu Matsumura; Noriyuki Nose, both of Kawasaki; Youichi Okuno, Yokohama, all of Japan

[73] Assignee: Canon Kabushiki Kaisha, Tokyo, Japan

[21] Appl. No.: 830,036

[22] Filed: Sep. 2, 1977

[30] Foreign Application Priority Data

Sep. 7, 1976 [JP] Japan .................. 51-106886

[51] Int. Cl.² ............................................ G03B 17/20
[52] U.S. Cl. ............................... 354/53; 340/52 F; 350/3.85; 354/289
[58] Field of Search ............. 354/53, 54, 55, 56, 354/57, 22, 289; 340/52 F; 350/3.5

[56] References Cited

U.S. PATENT DOCUMENTS

| | | | |
|---|---|---|---|
| 3,323,430 | 6/1967 | Cooper, Jr. ............ | 354/22 |
| 3,374,718 | 3/1968 | Hochreiter ............ | 354/53 |
| 3,560,921 | 2/1971 | Lopez .................. | 340/52 F |
| 3,668,985 | 6/1972 | Wazumi ................ | 354/53 |
| 3,672,286 | 6/1972 | Wagner et al. ........ | 354/57 |
| 4,016,576 | 4/1977 | Nomura ................ | 354/55 |

FOREIGN PATENT DOCUMENTS 1532389  6/1968  France ..................... 350/3.5

*Primary Examiner*—Russell E. Adams
*Attorney, Agent, or Firm*—Toren, McGeady and Stanger

[57] ABSTRACT

A camera having a holographic indicator in which a reconstructed image of hologram and an image of an object formed by an image forming optical system are formed on the same plane, so that the reconstructed image and the object's image can be observed at the same diopter through a common observation optical system.

7 Claims, 17 Drawing Figures

CAMERA HAVING A HOLOGRAPHIC INDICATOR

BACKGROUND OF THE INVENTION

1. Field of the Invention:

This invention relates to a camera having a holographic indicator and more particularly to a camera having a holographic indicator which forms a reconstructed image of a hologram on the same plane as that of an object's image formed by an image forming optical system.

Generally the term "hologram" is used to mean interference fringes which are formed by an object's wave front and a reference wave front and are recorded on a hologram recording medium. However, this term "hologram" is used herein for a broader concept to include also interference fringes produced by means other than the above-stated means such as the interference fringes produced by a ultrasonic bulk wave, a computer calculated hologram and the like.

2. Description of the Prior Art:

In the past, a holographic indicator similar to the present invention has been disclosed in the specification of U.S. Pat. No. 3,560,921. In this patent a hologram is disposed at a sight window provided in a helmet for a pilot to enable him to observe a far distant object simultaneously with a hologram image which is reconstructed at the far distant positon.

However, unlike the device disclosed in the above-stated U.S. patent, this invention relates to a holographic indicator wherein a reconstructed hologram image is formed on the same plane as that of an object's image formed by an image forming optical system.

SUMMARY OF THE INVENTION

Accordingly, it is an object of this invention to provide a camera having a holographic indicator wherein an object's image formed by an image forming optical system and a reconstructed image from a hologram are formed on the same plane. To attain this object, a hologram is made and positioned in such a manner as to have its reconstructed image formed on the image surface of the image forming optical system.

It is another object of this invention to provide a camera having a holographic indicator wherein an object's image formed by an image forming optical system and a reconstructed image of a hologram which is reproducible by ordinary incoherent light are formed on the same plane. To attain this object, the device uses a focused image hologram.

It is still another object of this invention to provide a camera having a holographic indicator wherein an object's image and a reconstructed image overlap each other on the same plane. To attain this object, a hologram is positioned in such a manner as to have its reconstructed image overlapping the object's image formed on the image surface of the image forming optical system.

It is a further object of this invention to provide a camera having a holographic indicator wherein a hologram is reconstructed by means of ordinary incoherent light and a reconstructed image of the hologram is arranged to overlap an object's image on the same plane as that of the latter.

It is still a further object of this invention to provide a camera having a holographic indicator wherein a reconstructed image of a hologram formed by ordinary incoherent light is arranged to overlap an object's image on the same plane; however the hologram does not affect the image of an image forming optical system when the hologram is not illuminated with the light. This object is attained by the use of a volume type hologram.

In accordance with this invention, an image of an object formed by an image forming optical system and a reconstructed hologram image are arranged to be formed on the same plane, so that these two images can be observed at the same diopter by means of a common observation optical system.

Other objects and advantages of the invention will become apparent from the following description of preferred embodiments with reference to the accompanying drawings.

Figure 1:
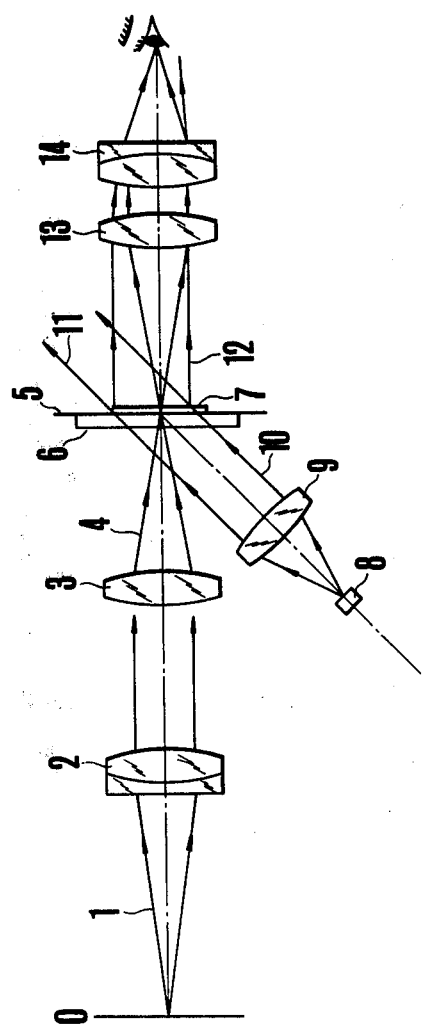
FIG. 1 is an illustration of an embodiment of this invention wherein a reconstructed image of a volume type focused image hologram is arranged to overlap an object's image formed by an image forming optical system on the same plane as that of the latter to permit observation of the reconstructed hologram image together with the object's image. The image forming system is, for example a view finder of a movie camera.

DESCRIPTION OF THE PREFERRED EMBODIMENT:

FIG. 1 illustrates a first embodiment of this invention. This embodiment is an example wherein a hologram which can be reconstructed by ordinary incoherent light is used and an object's real image formed by an image forming optical system is arranged to overlap a two-dimensional reconstructed real image of the hologram on the same plane. The image forming optical system is, for example, a view finder of a movie camera. In order to permit reconstruction by means of ordinary incoherent light, a focused image hologram is employed in this example. In this case, for making the real image of an object and the reconstructed real image of the hologram overlap each other, the focused image hologram itself must be arranged to overlap the object's image. Accordingly, the hologram is illuminated by a light flux that forms the object's image. In this particular embodiment example, however, a volume type hologram is employed so that the hologram does not affect the object's image when such a reconstructed image is not required.

In FIG. 1, 0 is the primary image of the object formed by the objective lens which is not shown and a light flux 1 coming from the primary image 0 passes through a lens 2 to form a secondary image of the object on a secondary image forming surface 5. A hologram 7 is disposed on a transparent carrier 6 which is superposed on the secondary object's image formed on the secondary image forming surface. The hologram 7 is illuminated by means of an ordinary incoherent light source 8. Then a divergent beam from the light source 8 is made into a parallel beam by a lens 9 and its incident angle to the hologram is made to be about equal to the incident angle of a reference beam used for making the hologram. A diffraction wave is reconstructed from the hologram 7 and is allowed to come in the direction of an optical axis of an observation optical system and makes a reconstructed image. When the hologram is an image type hologram, the image is reconstructed on the hologram plane and overlaps on the secondary object's image in the vicinity of the image forming surface. The reconstructed image can be observed through the observation optical system 13 and 14 together with the object's image at the same diopter.

Figure 2:
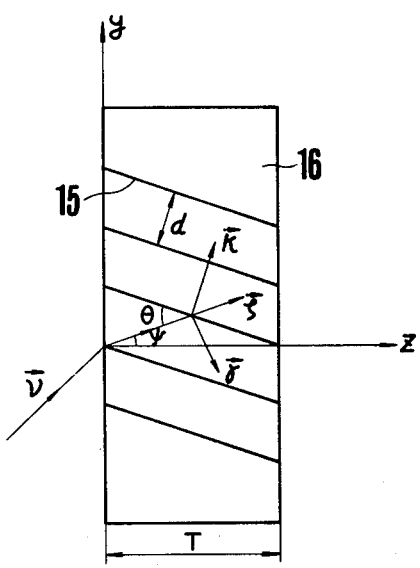
FIG. 2 is an illustration of a volume type hologram.
Figure 3:
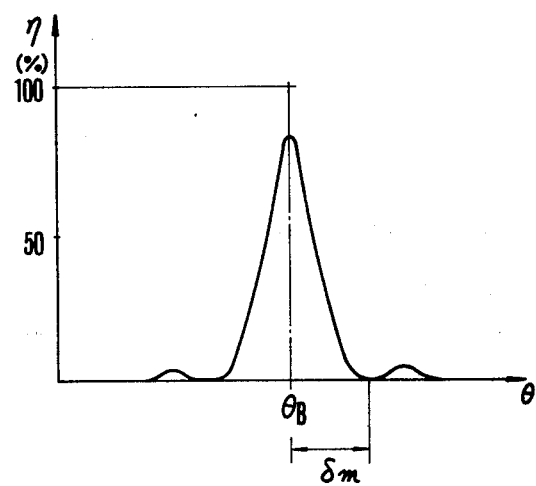
FIG. 3 is a graph illustrating the relation of diffraction efficiency of a volume type hologram to angle of incidence of illuminating beam.

Generally, however, when a hologram is arranged to overlap an object's image as in the case of this embodiment, a light flux of the object's image is diffracted at the portion in which the hologram fringes are formed and not diffracted at the portion in which the fringes are not formed. Then the portion in which hologram fringes are formed is observed through the observation optical system 13 and 14. Further, in the case of a focused image hologram, illumination by the image forming light flux always results in production of a negative image of the reconstructed image of the hologram together with an object's image. To solve such a problem, therefore, a volume type hologram is employed and the Bragg angle width of the volume hologram is set to be smaller than the spreading angle of the object image forming light flux. This will be understood from the following description:

Referring to FIG. 2, the term "volume type hologram" means a diffracting body the diffraction grating structure of which is in a three dimensional form. Such a diffraction grating structure may be in the form of either density distribution or refractive index distribution. However, in order to prevent the object image forming light flux from being affected, the diffraction grating structure is preferably in the form of refractive index distribution. With conditions suitably predetermined, the diffraction grating of the volume type hologram is characterized in that the maximum diffraction efficiency can be obtained only for a light flux incident thereon from a specific direction. In other words, such a diffraction grating possesses a strong directional characteristic in terms of diffraction efficiency. FIG. 3 illustrates such a characteristic showing the variation of diffraction efficiency that takes place with variation in the incident angle of a light flux that illuminates a diffraction grating of the volume type hologram. An illuminating angle $\theta_B$ at which the diffraction efficiency reaches its maximum is called a Bragg angle, which is expressed by the following diffraction condition formula of Bragg:

$$\vec{\sigma} = \vec{p} + \vec{K} \tag{1}$$

wherein $\vec{\sigma}$ and $\vec{p}$ represent a wave number vector of incident light and diffraction light respectively; and $\vec{K}$ represents a reciprocal vector of diffraction grating (see FIG. 2). From this, the following formulas are obtained:

$$|\vec{p}| = 51 \, \vec{\sigma}| = 2\pi/\lambda_m \tag{2}$$

($\lambda_m$ represents wave length within diffraction grating), and $$|\vec{K}| = 2\pi/d \tag{3}$$

(d: grating spacing distance).

Assuming that the reciprocal vector $\vec{K}$ is on a YZ plane shown in FIG. 2, the condition formula of Bragg becomes:

$$2d \sin \theta_B = \lambda_a/n_o \tag{4}$$

wherein $\lambda_a$ represents wave length in air and $n_o$ is a mean refractive index of a diffraction grating.

Further, the angle width $\delta_m$ of directional character in relation to the grating spacing distance d becomes narrower as the thickness of the diffraction grating increases. In the case of the fringes of a grating is perpendicular to the surface of diffraction grating and the fringes are formed with refractive index distribution, its angle width $\delta_m$ is obtained from the following formulas:

$$\delta_m = 3\lambda_a / 2\pi n_o T \sin \theta_B \tag{5}$$

$$\simeq d/T \tag{6}$$

For example, $n_o = 1.52$, T=15 82m, $\lambda_a = 0.488$ μm, $\theta_B = 19.2°$ (when 30° in air), the angle width $\delta_m$ becomes considerably narrow being 1.6° in an medium and 2.45° in air.

Figure 4:
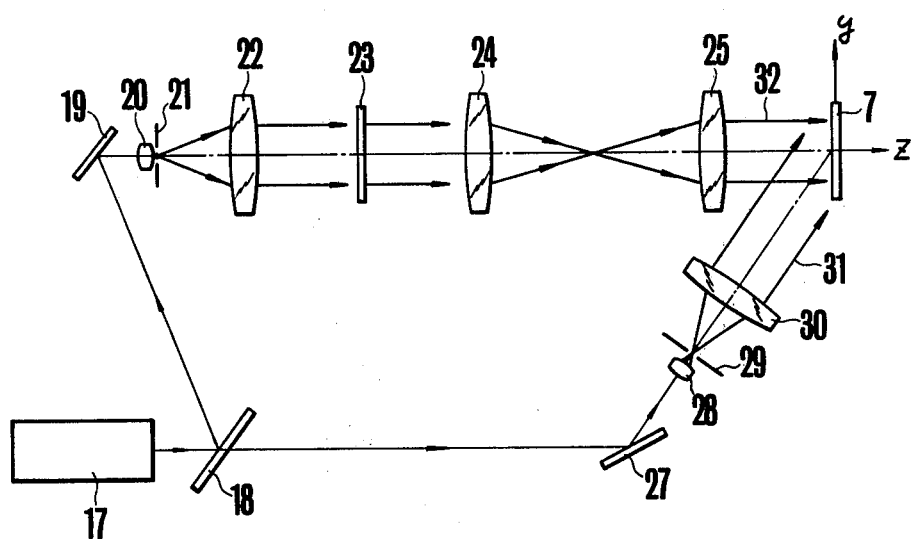
FIG. 4 is an illustration of a method of forming an image forming, volume type hologram.
Figure 5:
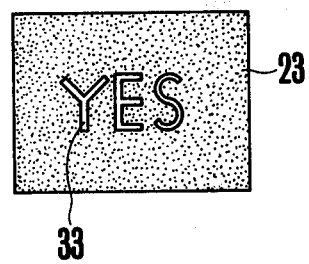
FIG. 5 is an illustration of a mask to be used in carrying out the method illustrated in FIG. 4.

FIG. 4 illustrates a method for forming a hologram and particularly a focused image hologram. A beam of light coming from a laser 17 is divided into two by a beam splitter 18. One of the divided beams of light is made into a divergent beam by an objective 20 of a microscope through a reflecting mirror 19. At the converging point of the beam, there is disposed a pin hole 21 to eliminate noises caused by a dust or the like sticking to the lens surface of the optical system. Then, the beam is made to be parallel by a collimeter lens 22 to illuminate a mask 23 in which a pattern to be displayed has been recorded. The pattern recorded in the mask 23 is imaged on the surface of a hologram recording medium 7 through an afocal lens system 24 and 25. The information light flux 32 which thus comes from the mask 23 is arranged to be perpendicularly incident upon the surface of the hologram recording medium 7. A displaying pattern portion of the mask 23 may be either transparent with an opaque background surrounding it or vice versa as shown in FIG. 5.

The other half of the beam of light divided by the beam splitter comes to be incident upon the hologram recording medium 7 through an optical system which is similar to the optical system used for illuminating the mask and consists of a microscope objective 28, a pin hole 29 and a collimeter lens 30. This beam of light 31 is known as reference beam in the art of holography. The reference beam 31 and the above stated mask information containing light flux 32 interfere with each other to form interference fringes on the hologram recording medium 7. Assuming that a phase type sensitive material is employed as recording medium, such interference fringes are recorded in the form of phase distribution.

Figure 6:
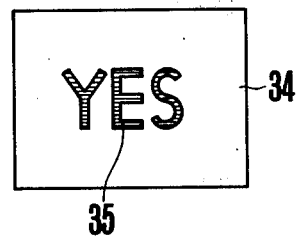
FIG. 6 is an illustration of an image forming, volume type hologram formed in accordance with the method of FIG. 4.

Phase type photo sensitive materials that are usable for such a purpose include dichromated gelatin, photopolymer, bleached silver salt, etc. An focused image phase type hologram 34 which is obtained in this manner possesses a structure of diffraction grating 35 only in the display pattern portion as shown in FIG. 6.

In the case of the embodiment which is illustrated in FIG. 1 using a volume type phase hologram, the illumination light 10 which is incident at about the same angle as the incident angle of the reference beam used in forming a hologram satisfies the Bragg condition for the hologram 7 to ensure a maximum diffraction efficiency. Generally, in cases where a hologram is of a plane type, diffraction of the rays of all incident angles of the image forming light flux takes place to the outside of a light flux incident upon an observation optical system at about equal diffraction efficiency. As a result of this, the portion 35 forming a display pattern becomes darker than other portions surrounding it. This causes the pattern to be still visible even when the pattern is not displayed. In contrast with this, in the case of the volume type hologram which has a strong directional characteristic in accordance with this embodiment example, only the light flux portion in the vicinity of the portion that satisfies the Bragg condition is diffracted in the image forming light flux while the rest of the light flux remains unaffected by diffraction and passes through the hologram. Accordingly, the influence of diffraction by a hologram can be minimized and a display pattern remains invisible when not displayed if the angle width of the directional characteristic of a hologram is sufficiently small compared with the diverging angle of an image forming light flux. According to the results of experiments, such a pattern becomes invisible when the angle width of the directional characteristic is less than 5° and the diffraction efficiency of a hologram is less than 60%.

Unlike a plane type hologram, in the case of the hologram described in the foregoing, the pattern portion not only becomes dark but also is tinged with a color when the diffraction efficiency is above 60%. This is caused by lack of a part of color band of the image forming light flux and the pattern portion 35 is tinged with a color that is complementary to the excluded color. For the hologram, either a light emitting diode or a tangsten filament lamp emitting light close to white color may be employed as an illumination light source. When a tangsten filament lamp is employed as the illumination light source, the diffraction angle varies with the wave length of light, therefore the illumination light of a certain color band is dispersed on an eyepiece and the color of the display pattern varies with the position of the eye on the eyepiece. Therefore, in preparing a hologram, when the eye is placed in the middle part of the eyepiece, a pattern of color corresponding to the wave lengths used in preparing the hologram is observable if the thickness of the photo sensitive material remains unchanged in the preparation of the hologram. As apparent from the foregoing description, when a phase type volume type hologram is used, the illumination light flux can be efficiently guided to the eyepiece of display of information; and, when display is not required, the influence on the image forming light flux is minimized to make the display pattern invisible. In the foregoing description, the wave lengths for the preparation of a hologram and reconstruction thereof are made to be equal and the hologram illumination light is considered a parallel flux of rays for the sake of explaining this invention. In practising this invention, however, in many cases, the photo sensitive material for recording a phase type hologram is sensitive only to short wave length lights. On the contrary, for human eyes, green or red is preferable as display color. The wave length used for the preparation of a hologram, therefore, often differs from the wave length for the reconstruction thereof. Further, it is preferable not to make the illumination light flux into a parallel flux but to use a divergent light flux emitted from a light source as it is.

Figure 7:
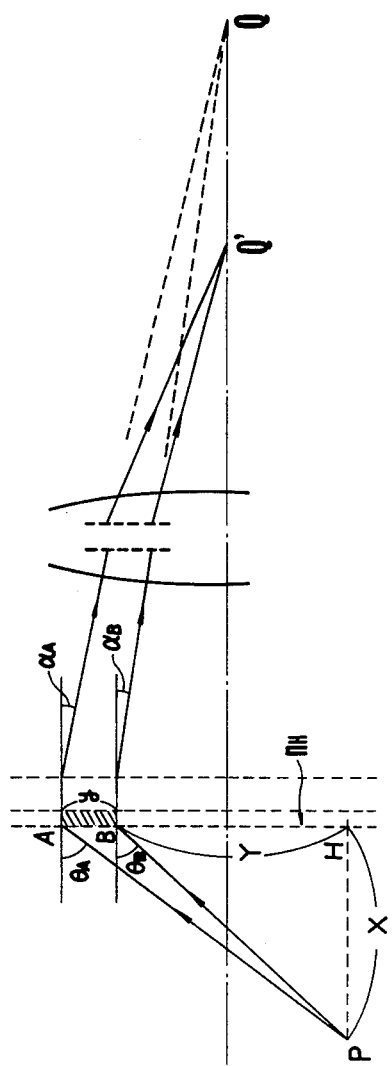
FIG. 7 is an illustration showing how to obtain desired fringes in a volume hologram.

Now, the following description covers a method wherein a volume hologram is prepared by light of a wave length to which a photosensitive material is highly sensitive and wherein light of a wave length which differs from the light used for preparation can be diffracted in the direction in which an image light flux travels:

Referring to FIG. 7, a hologram illuminating light source is disposed in a position P. The diffraction wave from a hologram converges at a converging point Q. Where an eyepiece is used, the converging point changes to a point Q' due to the action of the eyepiece. Further, with an eyepiece employed, the point Q' becomes an observation point. Let as assume that the distance between the surface of a photo sensitive material and the hologram illuminating light source is X and the point of intersection between the surface of the photo sensitive material and a line drawn from the point P downward perpendicularly to the surface of the photo sensitive material is H and further the distance between the point H and one end B of the hologram which is closer to the point H than the other end A of the hologram is Y. Also let us assume that the distance between the two ends A and B of the hologram is y and diffraction angles of the light diffracted from hologram to converge at the point Q, with reference to the ends A and B, are respectively $\alpha_A$ and $\alpha_B$.

Then, assuming that the incident angles of the light emitted from the light source P to be incident on the two ends A and B of the hologram are respectively $\theta_A$ and $\theta_B$, the following relation obtains:

$$\theta_A = \tan^{-1}(Y+y/X), \theta_B = \tan^{-1}Y/X$$

Therefore, assuming that the incident angles inside the photo-sensitive layer of the photo-sensitive material are $\theta'_A$ and $\theta'_B$ respectively and the refractive index of the photo-sensitive material which has been made into a hologram is $n_H$, there obtains the following relation:

$$\theta'_A = \sin^{-1}(\sin\theta_A/n_H), \quad \theta'_B = \sin^{-1}(\sin\theta_B/n_H)$$

Let us assume that the tilting angles of the diffraction grating at the ends A and B are $\phi_A$ and $\phi_B$ and its pitches dA and dB respectively. The above stated diffraction angles $\alpha_A$ and $\alpha_B$ are converted into the diffraction angles $\alpha_A'$ and $\alpha_B'$ in the photo-sensitive material as follows:

$$\alpha_A' = \sin^{-1}(\sin\alpha_A/n_H), \quad \alpha_B' = \sin^{-1}(\sin\alpha_B/n_H)$$

Therefore, assuming that the wave length used in reconstruction of the hologram is $\lambda_o$, the following formula is obtained:

$$\begin{cases} \phi_A = \dfrac{\theta_A' - \alpha_A'}{2} \\ d_A = \dfrac{\lambda_o}{2n_H \sin(\theta_A' - \phi_A)} \end{cases} \quad \begin{cases} \phi_B = \dfrac{\theta_B' - \alpha_B'}{2} \\ d_B = \dfrac{\lambda_o}{2n_H \sin(\theta_B' - \phi_B)} \end{cases} \quad (1)$$

The tilting angle and the pitch of the diffraction grating required for reconstruction can be obtained from the Formula (1) above. Such a diffraction grating is prepared by a beam of a laser of wave length $\bar{\lambda}_o$. In the process of preparation of a hologram, the thickness of the photo-sensitive material varies. Therefore, some allowance for variation in the tilting angle and pitch of the diffraction grating must be taken into consideration in arranging the reference wave and the object's wave of the laser beams in order to obtain the desired tilting angle and pitch of the diffraction grating.

Assuming that the expansion amount of the hologram is e%, the results of such expansion is applied to the condition of Formula (1) above to obtain the following, the tilting angle and the pitch of the diffraction grating before the expansion being assumed to be $\phi_A$ or $\phi_B$ and $D_A$ or $D_B$ respectively:

$$\begin{cases} \bar{\phi}_A = \tan^{-1}\left\{ (1 + \dfrac{e}{100}) \times \tan\phi_A \right\} \\ \bar{d}_A = \dfrac{\cos\phi_A}{\cos\bar{\phi}_A} d_A \end{cases} \quad (2)$$

$$\begin{cases} \bar{\phi}_B = \tan^{-1}\left\{ (1 + \dfrac{e}{100}) \times \tan\phi_B \right\} \\ \bar{d}_B = \dfrac{\cos\phi_B}{\cos\bar{\phi}_B} \end{cases}$$

Figure 8:
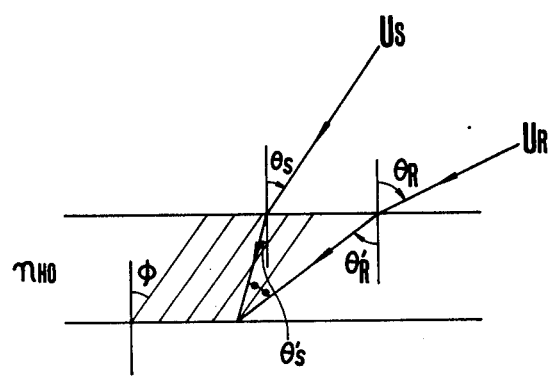
FIG. 8 is an illustration of interference between an object wave and a reference wave in a photo-sensitive material.

Referring now to FIG. 8, let us assume that the incident angle of the object's wave and that of the reference wave when these waves are allowed to intefere with each other are $\theta S'$ and $\theta R'$ and the refractive index of the photo-sensitive material before exposure is $n_{Ho}$. Then there obtains the following relation:

$$\begin{cases} \phi_A = \dfrac{\theta_{RA}' + \theta_{SA}'}{2} \\ d_A = \dfrac{\bar{\lambda}_o \cos\phi_A}{(\sin\theta_{RA}' - \sin\theta_{SA}')n_{Ho}} \end{cases}$$

$$\begin{cases} \phi_B = \dfrac{\theta_{RB}' + \theta_{SB}'}{2} \\ d_B = \dfrac{\bar{\lambda}_o \cos\phi_B}{(\sin\theta_{RD}' - \sin\theta_{SB}')n_{Ho}} \end{cases}$$

The values of $\theta_{RA}'$ or $\theta_{RB}'$ and $\theta_{SA}'$ or $\theta_{SB}'$ then can be obtained from the following formula:

$$\begin{cases} \theta_{RA}' + \theta_{SA}' = 2\phi_A \\ \sin\theta_{RA}' - \sin\theta_{SA}' = \dfrac{\bar{\lambda}_o \cdot \cos\phi_A}{D_A \cdot n_{Ho}} \end{cases} \quad (3)$$

$$\begin{cases} \theta_{RB}' + \theta_{SB}' = 2\phi_B \\ \sin\theta_{RB}' - \sin\theta_{SB}' = \dfrac{\bar{\lambda}_o \cdot \cos\phi_B}{D_B \cdot n_{Ho}} \end{cases}$$

Since all of the angles obtained from Formula (3) above are incident angles in the photo-sensitive material, they are converted into angles in air $\theta_{RA}$ or $\theta_{RB}$ and $\theta_{SA}$ or $\theta_{SB}$ through the following formula:

$$\begin{cases} \theta_{RA} = \sin^{-1}(n_{Ho} \cdot \sin\theta_{RA}') \\ \theta_{SA} = \sin^{-1}(n_{Ho} \cdot \sin\theta_{SA}') \end{cases} \quad \begin{cases} \theta_{RB} = \sin^{-1}(n_{Ho} \cdot \sin\theta_{RB}') \\ \theta_{SB} = \sin^{-1}(n_{Ho} \cdot \sin\theta_{SB}') \end{cases} \quad (4)$$

Figure 9:
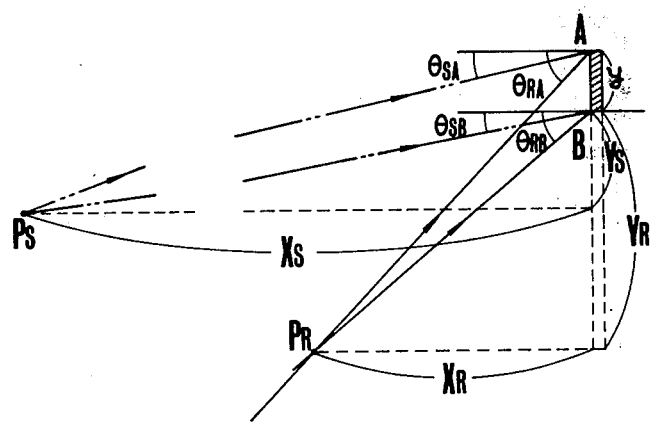
FIG. 9 is an illustration of the relative positions of the object wave and the reference wave required for obtaining desired fringes in a volume hologram.

Referring to FIG. 9, let us assume that an optical system is arranged with the end B of the hologram being a start point; the center of the wave front of the object's wave being PS; the center of the reference wave being PR; and the arrangement being expressed as PS ($X_S$, $Y_S$), PR ($X_R$, $Y_R$). Then, there obtains the following relation:

$$\begin{cases} \dfrac{Y_S}{X_S} = \tan\theta_{SB} \\ \dfrac{Y_S + y}{X_S} = \tan\theta_{SA} \end{cases} \quad \begin{cases} \dfrac{Y_R}{X_R} = \tan\theta_{RB} \\ \dfrac{Y_R + y}{X_R} = \tan\theta_{RA} \end{cases}$$

From the above stated relation, the following formula is obtained:

$$\begin{cases} X_S = \dfrac{y}{\tan\theta_{SA} - \tan\theta_{SB}} \\ Y_S = \dfrac{y \cdot \tan\theta_{SB}}{\tan\theta_{SA} - \tan\theta_{SB}} \end{cases} \quad \begin{cases} X_R = \dfrac{y}{\tan\theta_{RA} - \tan\theta_{RB}} \\ Y_R = \dfrac{y \cdot \tan\theta_{RB}}{\tan\theta_{RA} - \tan\theta_{RB}} \end{cases} \quad (5)$$

In other words, in order to permit observation of a reconstructed image of a hologram together with a picture, the travelling direction of the picture light flux which is incident upon the hologram and is emitted from (allowed to pass through) the hologram and, that of the reconstructed wave front of a predetermined wave length must be equalized with each other. Therefore, the exit angle of the picture light flux which is emitted from the hologram is predetermined. Then, the diffraction angle of a given wave length is determined to be equal to the exit angle of the picture light flux. To make the wave front of a given wave length emitted at the predetermined diffraction angle, an object's wave of a given wave length is allowed to be incident upon a hologram recording medium at an angle at which the picture light flux is anticipated to be incident upon the hologram and, concurrently with this, a reference wave of a given wave length is allowed to be incident upon the same hologram recording medium. The hologram which has been prepared in this manner is then illuminated with a reconstruction light from the incident direction of the reference wave.

In cases where a hologram recording medium does not have sensitivity to the above stated given wave length, however, a hologram that is similar to the hologram prepared with the given wave length must be prepared with light of wave length to which the recording medium is sensitive. For this purpose, therefore, the characteristic of a hologram that is capable of diffracting a wave front of a given wave length in the same direction as the travelling direction of the picture light flux, i.e the tilting angle of diffraction grating and the pitch thereof, is as described in relation to Formula (1) in the foregoing. The tilting angle of diffraction grating is formed on a bisector of an intersecting angle between the object's wave and the reference wave. The tilting angle given in Formula (1), therefore, can be obtained with a reference wave and an object's wave of sensible wave length which comes incident upon a hologram and a recording medium being arranged to be incident upon the hologram and the recording medium in such a manner that a bisector of an intersecting angle formed by them coincides with a line extended from a desired tilting angle of diffraction grating. The pitch of diffraction grating is determined by the intersecting angle of the object's wave and the reference wave and by their wave lengths. A diffraction grating of a predetermined pitch, therefore, can be obtained by adjusting the intersecting angle of the object's and reference waves using the bisector of the intersecting angle as center of such adjustment. For such adjustment, the position of the object's wave (center of wave front of the object's wave) and that of the reference wave (center of wave front of the reference wave) are obtainable from Formula (5).

To carry out reconstruction of a hologram using a point source P as described in the foregoing, the preparation of the hologram by a hologram preparation system in general must be carried out by interference between spherical waves. For example, a hologram to be reconstructed to have y=2 mm, X=4 mm, Y=3 mm. $\alpha_A=3°$, $\alpha_B=2.8°$ and $\lambda\alpha_B=0.55\mu$ in the generic formula given in the foregoing is prepared under the conditions of $\overline{\lambda}_o=0.488\mu$, $n_H=1.53$ and $n_{Ho}=1.58$. Then, the object's wave and the reference wave are allowed to interfere with each other with the wave front center PS ($X_S$, $Y_S$) of the object's wave and the center PR ($X_R$, $Y_R$) of the reference wave arranged to be:

$$\begin{cases} X_S = 83.6 \text{ mm} \\ Y_S = 6.8 \text{ mm} \end{cases} \begin{cases} X_R = 4.1 \text{ mm} \\ Y_R = 2.9 \text{ mm.} \end{cases}$$

In this case, the expansion amount is set at 15%.

Some of photo-sensitive materials, such as dichromated gelatin, are weak against humidity. The use of such a photo-sensitive material necessitate provision of a protective cover such as a cover glass on the front of the hologram. In such a case, the arrangement of a preparation optical system in relation to a reconstructing system to which a protective cover is attached can be made by obtaining the positions PS and PR in the same manner as in the case where there is used no such protective cover.

As mentioned in the foregoing, the light from the light source P can be correctly diffracted to an observation point Q with regard to the two ends of the hologram. However, there arise a slight degree of deviation with regard to other points. Such deviation results in decrease of the diffraction efficiency when the light source is nearly monochromatic and results in color deviation when the light source supplies white light of a certain magnitude. In the above-mentioned example, color deviation of about 6 nm takes place in the middle of the hologram. However, such a slight degree of color deviation is hardly discernible with the naked eye.

Figure 10:
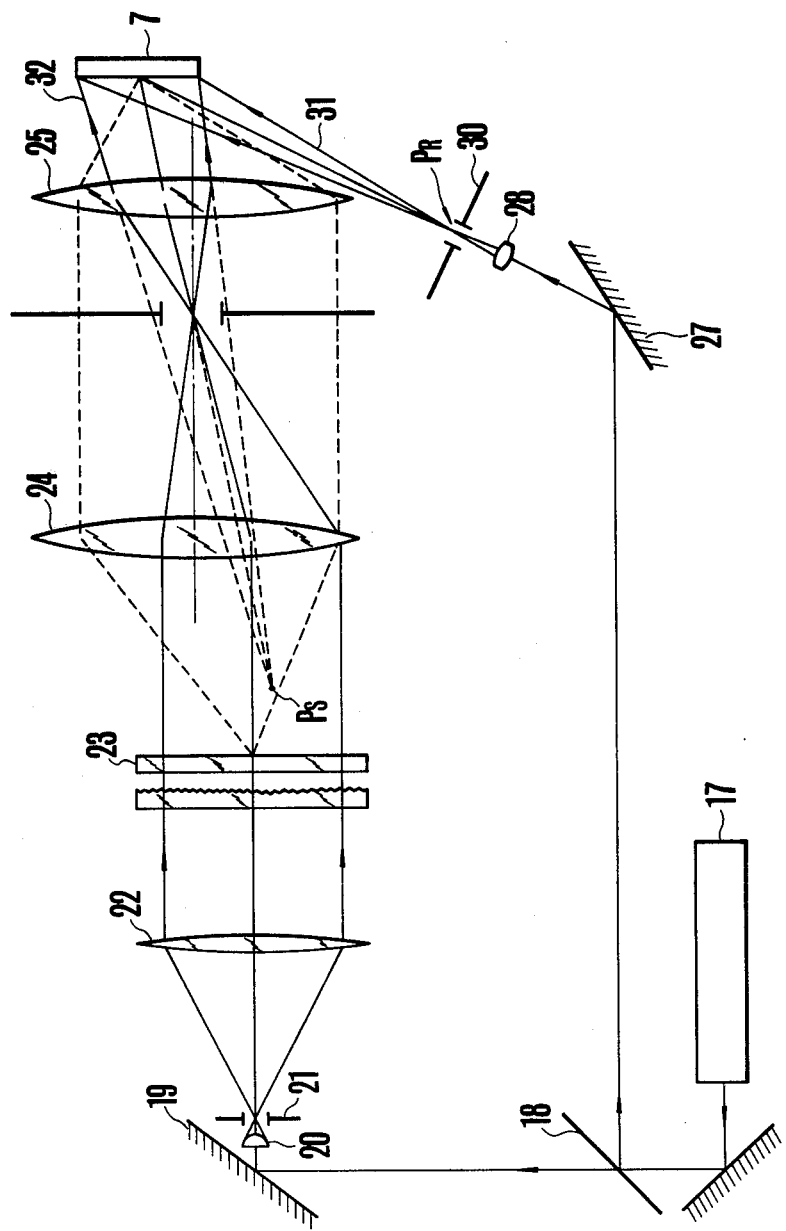
FIG. 10 illustrates another method which differs from the method illustrated in FIG. 4 for forming a hologram.

A spherical object's wave front and spherical reference wave front that are required for satisfying the above stated conditions can be obtained by modifying a part of the hologram preparation optical system of FIG. 4 into an arrangement as illustrated in FIG. 10. In other words, the distance between lenses 24 and 25 is adjusted to make the wave front emitted from the lens 25 into a spherical wave and to make its center of curvature the desired PS. Further, the collimeter lens 30 which has been disposed in the optical path of the reference wave is removed to make the wave front of the reference wave into a spherical wave and the center of curvature PR thereof is obtained at the converging point of the objective 28.

The object illuminating light described in the foregoing is non-diffusing light. However, such illumination presents the following problems:

An optical noise due to coherent illumination, or so called coherent noise, is recorded in the pattern to lower the quality of the reconstructed image. Further, when the position of the eye watching the observation optical system is shifted, the color of the whole reconstructed image pattern tends to change. In order to avoid such inconvenience for wider range of observation, the object illumination is changed to illumination by diffusing light.

However, mere change to diffusing illumination causes diffusion of the reconstruction light flux over a wide angle. Then, some portion of the light flux will be eclipsed by the observation optical system or by the eyepiece and the efficiency will be lowered by such. Such simple diffusing illumination also causes the directional characteristic of the hologram to be broadened and then the image forming light flux will be greatly affected thereby. In view of such problems, when diffusing illumination is employed, the degree to which the light flux is to be diffused must be controlled. Methods for effecting such control include a method wherein a circular aperture is provided in the rear focal plane of a lens 24 for filtering. The diameter D of such a circular aperture must be:

$$D < < 2f \sin \gamma$$

wherein f represents the focal length of a lens 13 and $\gamma$ the maximum exit angle of rays that are not eclipsed by the observation optical system and the eyepiece after emission from the hologram. Such arrangement ensures that a reconstructed image of a high quality can be obtained without lowering efficiency.

Figure 11:
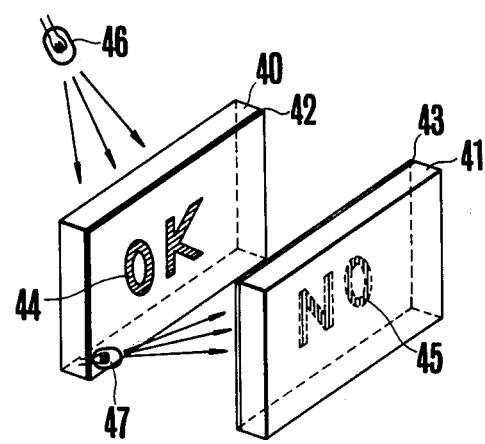
FIG. 11 is an illustration of a second embodiment of this invention which permits selective indicator of two marks.
Figure 12:
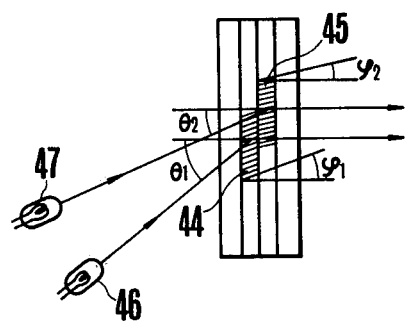
FIG. 12 is an illustration of a modification example of the second embodiment.

As mentioned in the foregoing, the diffraction efficiency of a volume type phase hologram depends upon the incident angle of illumination light and its angle characteristic is sharp. Such characteristic can be utilized for making selective display of a plurality of information. Referring to FIG. 11, different patterns are recorded in two holograms 40 and 41. The emulsion surfaces 42 and 43 of these holograms 40 and 41 are arranged to confront each other and is sticked together by means of an adhesive. When the direction, tilting angle or pitch of the interference fringes 44 and 45 of the carriers of these holograms are arranged to be different, the information of each hologram can be displayed independently of the other. In the example illustrated in FIG. 11, the directions of the carrier interference fringes of the first and second holograms are arranged to be in the horizontal and vertical directions respectively. In this particular example, the first hologram is illuminated by a miniature lamp 46 from the vertical direction while the second hologram is illuminated by another miniature lamp 47 from the horizontal direction. Also, such selection of information can be effected by arrangement as illustrated in FIG. 12 wherein the tilting angles $\phi_1$ and $\phi_2$ of the carrier interference fringes 44 and 45 are arranged to be different from each other. In this example, these holograms are illuminated by miniature lamps 46 and 47 from the directions $\theta_1$ and $\theta_2$ in which the condition of Bragg is satisfied. With the two holograms illuminated from the directions $\theta_1$ and $\theta_2$ with light of the same wave length respectively, the conditions of the carrier interference fringes required for making the diffraction waves from these holograms travel together in the direction of the optical axis can be obtained from the following formulas:

$$\phi_1 = \theta_1/2$$
$$\phi_2 = \theta_2/2$$
$$d_1 = \frac{\lambda_H}{2\sin(\phi_1 - \theta_1)}$$
$$d_2 = \frac{\lambda_H}{2\sin(\phi_2 - \theta_2)}$$

wherein $\phi_1$ and $\phi_2$ represent the tilting angles of carrier interference fringes; $d_1$ and $d_2$ spacing distance of interference fringes; $\lambda_H$ wave length in the hologram photo-sensitive material; and $\theta_1$ and $\theta_2$ illumination angle in the hologram photo-sensitive material. Further, assuming that the angle width of the directional characteristic of the hologram is $\delta_m$, the angle difference $\Delta\theta$ between two illumination angles required for completely separating the two different informations for displaying one independently of the other must satisfy the following relation:

$$\Delta\theta = \theta_1 - \theta_2 > \delta_m$$

Although two holograms are sticked together in this particular example to obtain a hologram that contains two different informations, a hologram having a plurality of informations also may be prepared by multiple exposure of a single hologram. In such a case, the directions, pitches or tilting angles of the carrier interference fringes of the hologram to be subjected to multiple printing are arranged to be different in the same manner as in the preceding example.

Figure 13:
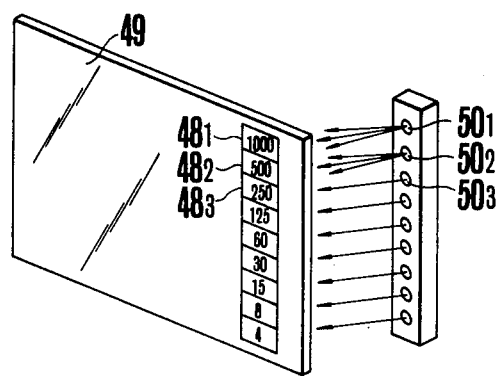
FIG. 13 is an illustration of a third embodiment of this invention which is capable of displaying many information marks.

Further, it is also possible to prepare many hologram elements on a single hologram plate 49 as illustrated in FIG. 13. In the example illustrated in FIG. 13, the focused image hologram elements $48_1$, $48_2$, . . . are arranged to be displayed by light sources $50_1$, $50_2$, . . . corresponding to these hologram elements respectively. A light emitting diode matrix may be used for such light sources. In this case, although each light source illuminates not only a corresponding hologram element but also adjacent elements, such illumination to the adjacent elements does not satisfy conditions required for illumination. Therefore, the informations in the adjacent hologram elements are not displayed while only the information in the corresponding hologram element is selectively displayed by each light source.

Figure 14:
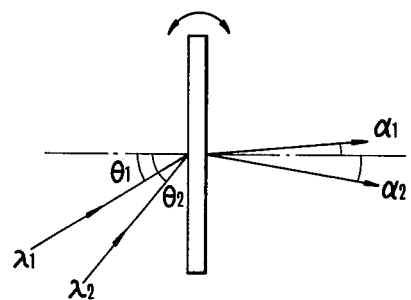
FIG. 14 is an illustration of diffraction light obtained when a volume type hologram is tilted.

As illustrated in FIG. 14, in a volume type hologram, the illumination angles $\theta_1$ and $\theta_2$ and the diffraction angles $\alpha_1$ and $\alpha_2$ of the light flux that satisfies the Bragg's diffraction condition vary with the wave length of the light flux. Accordingly, light of desired wave length can be diffracted in the direction of the optical axis by rotating the hologram to display a desired color. However, it is necessary that the light source supplies white light of a certain magnitude.

Further, with the spacing distance d of the interference fringes changed, the wave length of light flux to be diffracted into the direction of the optical axis can be varied accordingly even the direction of the illumination light flux remains unchanged. Elements that permit changing the spacing distance d of the grating in such a manner include an ultrasonic bulk wave grating. The color of display can be changed by changing the oscillation wave length of an ultrasonic element.

In the embodiment example illustrated in FIG. 12, it is possible to change the color of the two display informations by setting conditions for the carrier interference fringes in such a manner as to change the wave lengths of light to be diffracted respectively from the holograms 44 and 45 into the direction of the optical axis.

Figure 15:
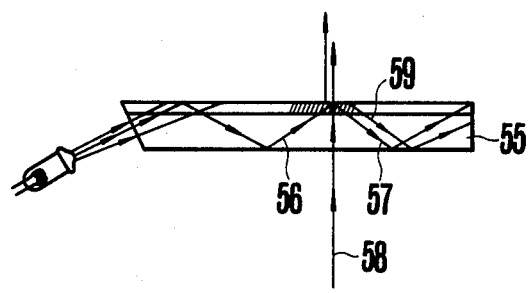
FIG. 15 illustrates a fourth embodiment of this invention.

In the foregoing embodiment examples, transmission type volume holograms are described. However such holograms may be replaced with reflection type holograms. Also, in the foregoing embodiment examples, holograms are arranged to be illuminated from outside. However, such arrangement may be replaced with arrangement as shown in FIG. 15, wherein a hologram is illuminated with a light flux which is arranged to make total reflection inside a hologram plate 55. The feature of such a total reflection illumination hologram lies in that a non-diffracted light flux 57 of an illumination light flux 56 and the diffraction light flux 59 of an image forming light flux 58 do not come out of the hologram. It is an advantage of such a hologram that the hologram plate 55 can be utilized as a wave guiding passage. A hologram of this type is suitable for information display in a show window, a single-lens reflex camera, etc.

Figure 16:
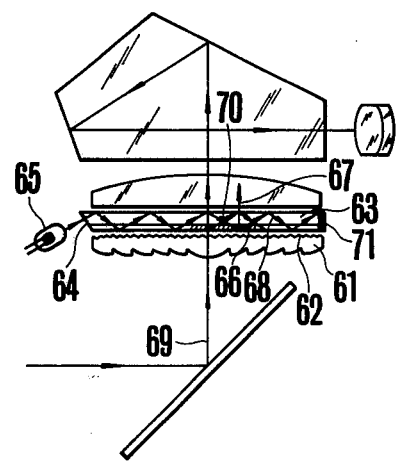
FIG. 16 is an illustration of a fifth embodiment of this invention wherein the information mark display arrangement of this invention is applied to a view finder optical system of a single-lens reflex camera.

Referring now to FIG. 16, an embodiment example of such a total reflection illumination hologram as applied to information display in a single-lens reflex camera is described as shown below:

A hologram plate 63 is disposed close to a mat face of a Fresnel focusing plate 61. It is preferable to set the surface of the hologram as close to the mat face 62 as possible, when the hologram is a focused image type hologram. One end 64 of the hologram plate 63 is formed into a slanting face through which an illumination light flux 65 is introduced into the hologram plate 63. The illumination light flux makes total reflection while inside the hologram plate it travels therein to illuminate a hologram portion 66 in which display information is recorded. This illumination produces a diffraction light flux 67 approximately in the direction of the optical axis to display the information inside a view finder. A light flux 68 which is not diffracted at the hologram and a light flux 70 which is produced by diffraction of a finder light flux 69 at the hologram portion travel while making total reflection within the hologram plate 63 until they reach another end 71 of the hologram plate. Then, with an absorbing paint provided at this end 71, such harmful fluxes of light can be eliminated.

Figure 17:
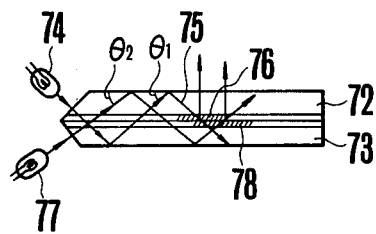
FIG. 17 is an illustration of a modification example of the embodiment illustrated in FIG. 16.

For selectively displaying a plurality of informations, it is preferable to use a hologram plate prepared by sticking two hologram plates 72 and 73 together as illustrated in FIG. 17. For the first hologram plate 72, its hologram portion 76 is illuminated with an illumination light flux 75 of a light source 74 which is disposed close to one end of the hologram plate 72. By this, an information light flux is obtained in the form of a reflection diffracting wave. For the second hologram plate 73, its hologram portion 78 is illuminated by a light source 77 disposed close to one end of the second hologram plate to obtain an information light flux in the form of a transmission diffracting wave. In this case, it is necessary to make the total reflection angles $\theta_1$ and $\theta_2$ of the two illuminating light fluxes differ from each other in such a manner that the illumination light flux for one hologram is not diffracted by the other hologram.

In addition to above embodiments, this invention allows Fresnel hologram as said hologram and can utilize both real and virtual reconstructed image of the hologram.

What is claimed is:

1. A camera comprising:
   objective lens means for forming an image of an object;
   exposure control means associated with the lens means for determining the time and intensity of the image formed by said lens means, and
   a view finder having
      image-forming optical means for forming another image of the object on a plane
      a volume and phase recorded focused image hologram having at least one indicating mark recorded thereon,
      carrier means for holding said focused image hologram on the plane of the other image over-lapping the hologram with the image,
      illuminating means for illuminating the hologram and reconstructing the recorded mark, and
      optical means for viewing the reconstructed mark and the overlapped with the other imaged.

2. A camera as in claim 1, wherein said hologram is recording with an object having an indicating mark by illuminating the object with a diffused coherent light and causing interference between the light from the object and the reference light.

3. A camera as in claim 1, wherein said hologram is illuminated by said illuminating means, said illuminating means being arranged to produce a total reflection in the carrier means.

4. A camera as in claim 1, wherein said hologram has a plurality of marks thereon and said illuminating means forms a selective display of the plurality of marks.

5. A camera as in claim 4, wherein the plurality of marks are recorded at different interference angles.

6. A camera as in claim 1, wherein said objective lens means and said image forming means each have a light conductive portion.

7. A camera comprising: an objective lens for forming an image of an object.
   exposure control means associated with the lens means for determining the time and intensity of the image formed by said lens means, and
   a view finder including
      an image-forming optical system directing light along a path and forming another image of the object on a plane,
      a phase type focused image hologram on which at least one indicating mark is recorded,
      carrying means for holding said focused image hologram at the plane of the other image and over-lapping the other image,
      illuminating means out of the path for illuminating the hologram to obtain a reconstructed image, and
      optical means for viewing the reconstructed image and the other image,
   said illuminating means being arranged to illuminate the hologram from a direction in which the zero order diffraction light through the hologram by-passes the optical means, and said hologram has a spatial frequency which causes light from the reconstructed image to pass through the optical means.

* * * * *